United States Patent [19]

Gidlund

[11] Patent Number: 4,662,556
[45] Date of Patent: May 5, 1987

[54] DEVICE FOR ASSEMBLING BY RIVETING TWO OR MORE SECTIONS OF A STRUCTURE

[75] Inventor: Per Adolf L. Gidlund, Täby, Sweden

[73] Assignee: Atlas Copco Aktiebolag, Nacka, Sweden

[21] Appl. No.: 661,654

[22] Filed: Oct. 17, 1984

[30] Foreign Application Priority Data

Oct. 21, 1983 [SE] Sweden ................................ 8305818

[51] Int. Cl.⁴ ........................ B21J 15/10; B21J 15/12; B21J 15/30
[52] U.S. Cl. ....................................... 227/69; 29/703; 29/526 A; 227/51; 227/111; 227/152
[58] Field of Search ....................... 227/27, 51, 52, 57, 227/61, 67, 110, 111, 151-153; 29/243.53, 243.54, 526 A, 565, 788, 796, 703

[56] References Cited

U.S. PATENT DOCUMENTS

| | | | |
|---|---|---|---|
| 1,158,874 | 11/1915 | Walker | 29/243.54 |
| 2,559,248 | 7/1951 | Harcourt | 29/243.53 |
| 3,534,896 | 10/1970 | Speller et al. | 227/51 |
| 3,696,501 | 10/1972 | Burtin | 227/61 X |
| 4,203,204 | 5/1980 | Murphy | 29/703 |
| 4,310,964 | 1/1982 | Murphy | 29/526 A X |

FOREIGN PATENT DOCUMENTS

| | | | |
|---|---|---|---|
| 1061607 | 4/1954 | France | 227/51 |
| 0318253 | 12/1956 | Switzerland | 227/52 |
| 0000839 | of 1877 | United Kingdom | 227/51 |

Primary Examiner—John Sipos
Assistant Examiner—Taylor J. Ross
Attorney, Agent, or Firm—Frishauf, Holtz, Goodman & Woodward

[57] ABSTRACT

A device for assembling by riveting two or more sections of a sheet element structure wherein the sections (A, B) to be assembled are supported in a fixed stationary mode. A guide beam (16, 116) is clamped firmly against one side of the sections and supports a selectively movable working unit (17, 117) comprising drilling machines (45, 46) and rivet supplying and installing means (48, 49) and a riveting hammer (50). A multiple or single point thrust and rivet bucking means (32, 132) is arranged on the opposite side of the sections (A, B) and comprises clamping force producing thrust elements (34; 134) as well as a rivet bucking die (41; 141). A computerized control system (43, 53) governs the operation cycles of the working unit (17;117) as well as the thrust and rivet bucking means (32; 132).

9 Claims, 8 Drawing Figures

DEVICE FOR ASSEMBLING BY RIVETING TWO OR MORE SECTIONS OF A STRUCTURE

BACKGROUND OF THE INVENTION

This invention pertains to a device for mechanized assembling by riveting two or more sections of a sheet element structure, for example sections of an aircraft fuselage.

A previous device for mechanized riveting of such big structure sections is characterized by huge physical dimensions which require not only very big sums of investment in the system itself but in extra large and costly premises for housing the device.

The reason why this previously known riveting system is of such a big size and requires such a large space is mainly that the riveting method used is based upon upsetting the rivets by pressing. Because of that, very heavy forces are required for accomplishing the rivet installation, which in turn requires a very big and rigid machine structure. This is accentuated when very large sheet sections are to be joined, because the riveting tools as well as the rivet bucking tools have to reach points situated a long distance from the outer edge of the sections.

A known device of this type is described in U.S. Pat. No. 3,534,896.

The main object of this invention is to create a device for assembling sections of a sheet element structure by riveting, which device requires neither such an expensive huge dimension equipment nor such a large and costly space as do previously known devices for mechanized riveting.

An embodiment of the system according to the invention is hereinbelow described in detail under reference to the accompanying drawings.

BRIEF DESCRIPTION OF THE DRAWINGS

In FIG. 1 the riveting system according to the invention is shown in connection with an aircraft fuselage assemblage. The fuselage is assembled from a number of part-cylindrical prefabricated sections A, B, C, D . . . which are fixed relative to each other in predetermined positions by a stationary support frame 10. The latter comprises two arc-shaped girders 11, 12 disposed at the ends of the sections A–D. Two carriages 13, 14 are movably supported on the girders 11, 12 and carry between them an elongated guide beam 16. The latter extends over the entire length of the sections A–D and is intended to be fixedly located over the longitudinal section joints, one at a time.

Figure 1:
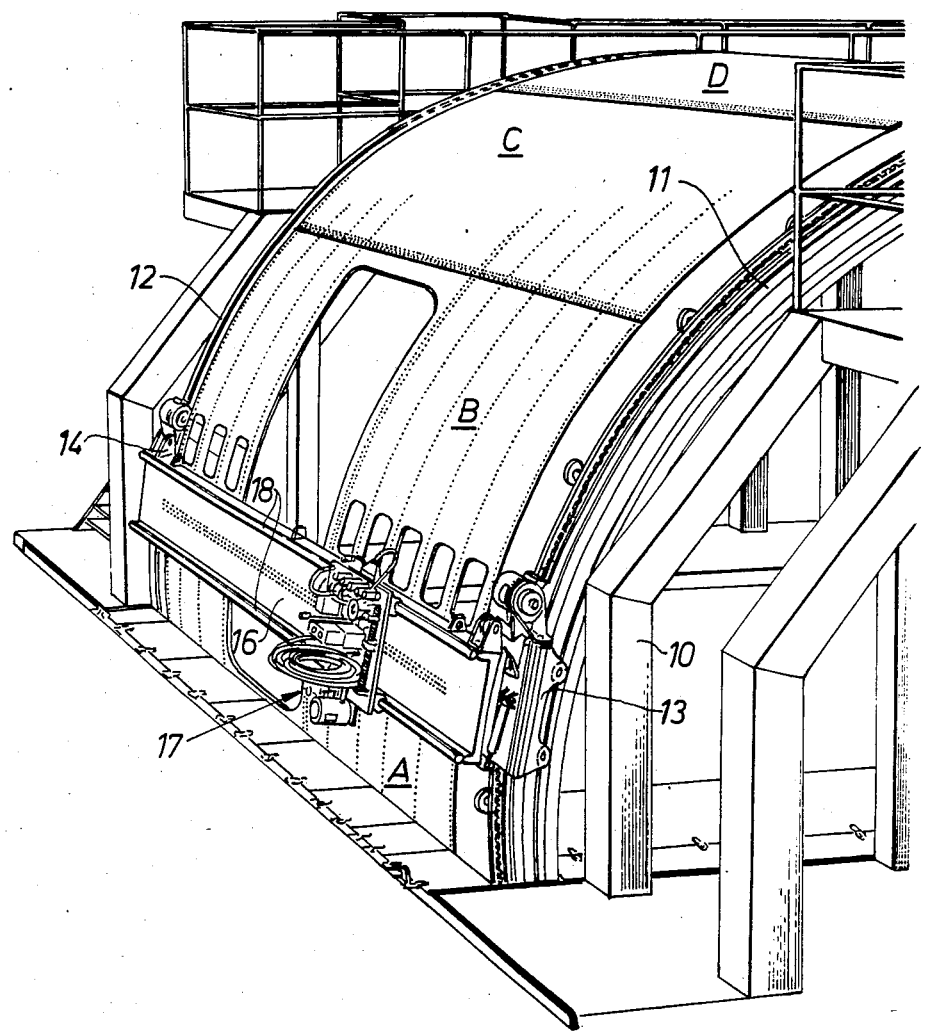
FIG. 1 illustrates an application situation for the riveting system according to the invention.

On the guide beam 16 there is supported a working unit 17 which is arranged to be moved stepwise along the guide beam 16 between predetermined riveting positions. For that purpose, the guide beam 16 is formed with two parallel rails 18 with which mating guide shoes 19 on the working unit 17 cooperate. See FIG. 3. These guide shoes 19 are mounted on a main frame 20 of the working unit 17. On the main frame 20 there are also two parallel guiding rules 22 extending transverse to the guide beam rails 18 and on which a subunit 24 is supported by means of wheels 25.

The guide beam 16 comprises a great number of apertures 30 each coinciding with a predetermined rivet position. This means that the guide beam 16 is specifically adapted to the very rivet pattern of one particular section joint or type of section joint. In its work position, the guide beam 16 is rigidly secured to the two fuselage sections A, B to be assembled by means of screws or threaded dowels 31. See FIG. 4. The latter extend through the sections A, B and secure a number of thrust and rivet bucking units 32 on the opposite side of the sections A, B. The purpose of these screws 31 is to obtain a firm contact pressure between the sections to be assembled.

Each of the thrust and rivet buckling units 32 has a length covering the distance between adjacent ribs 33 on the inside of the fuselage sections. See FIG. 2. Each unit 32 comprises a thrust plate 34 which, like the guide beam 16, is formed with a number of apertures 35 which are arranged to coincide with the predetermined rivet positions on the respective parts of the sections to be assembled. The units 32 as well as the guide beam 16 are provided with a resilient lining 36 and 37, respectively, so as to accomplish an evenly distributed contact pressure on the sections. See FIG. 4.

Figure 2:
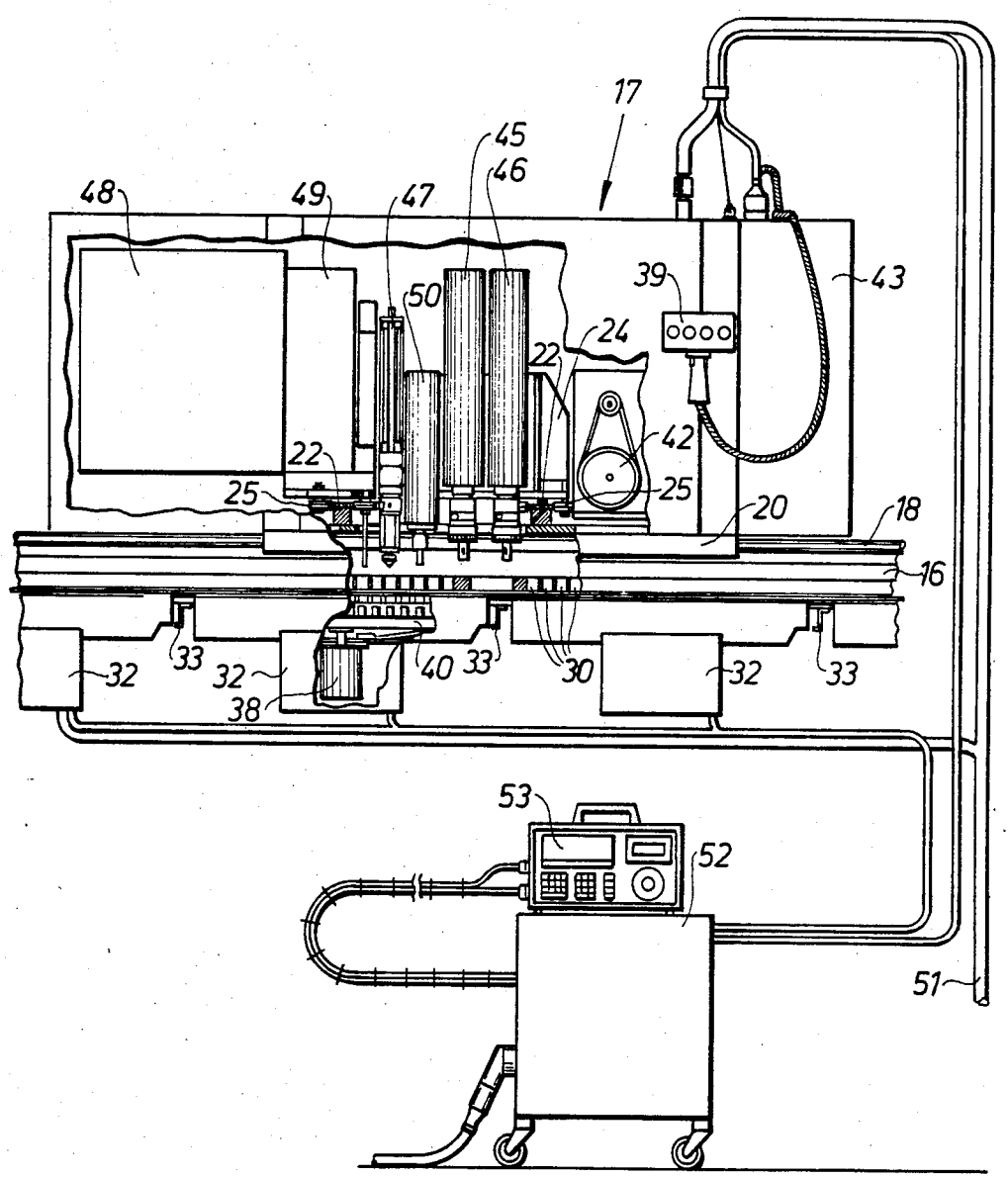
FIG. 2 shows a schematic side view of the components of the system.
Figure 3:
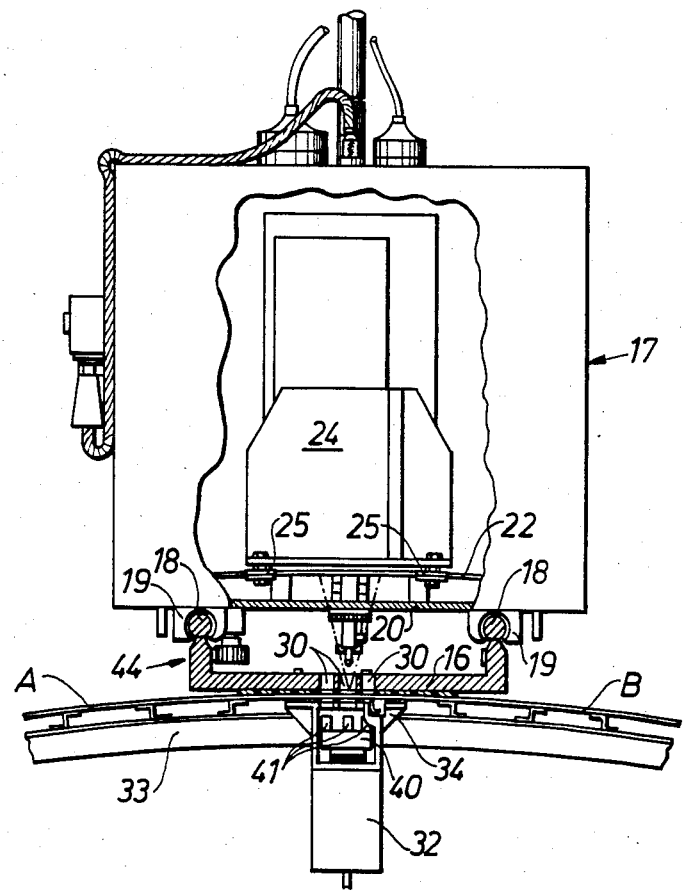
FIG. 3 is an end view of the system shown in FIG. 2.
Figure 4:
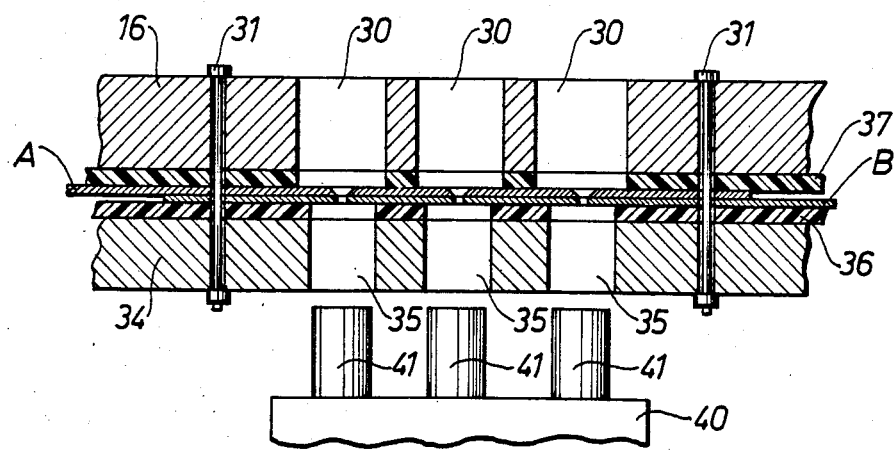
FIG. 4 is a fragmental end view, on a larger scale, of the thrust and rivet bucking means of the system shown in FIGS. 1–3.
Figure 5:
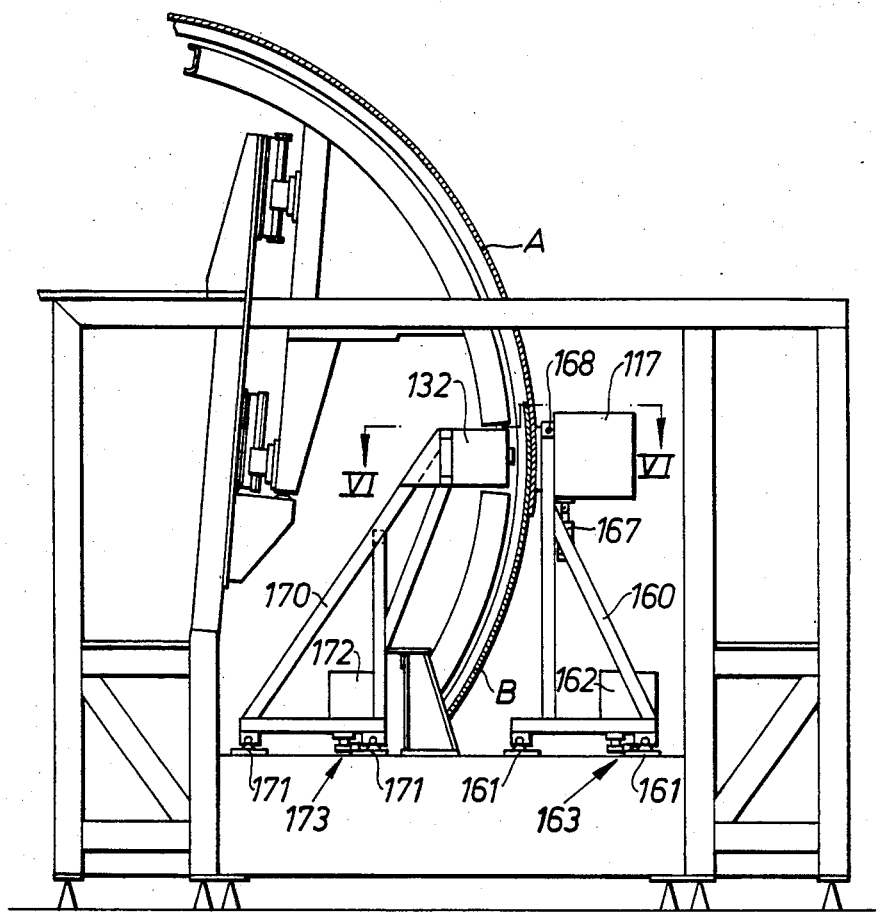
FIG. 5 is an end view of an alternative embodiment of the invention.
Figure 6:
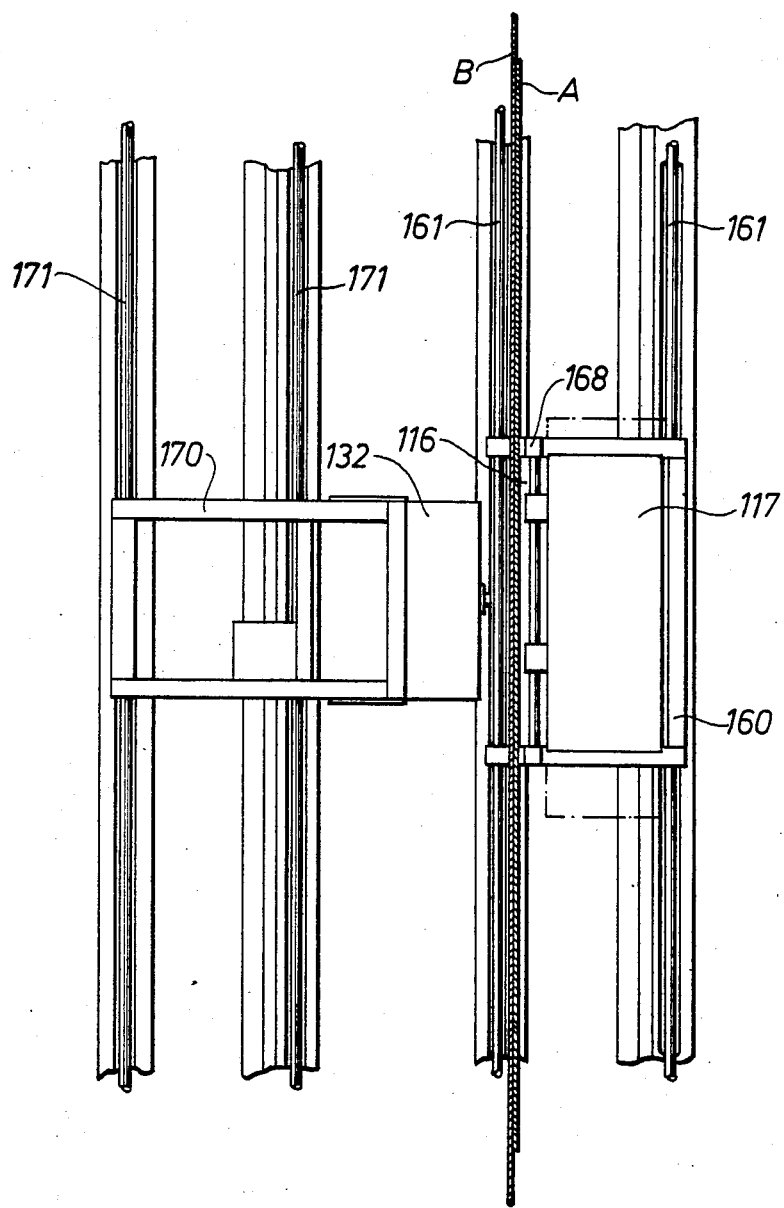
FIG. 6 is a top view of the device in FIG. 5.

Moreover, each of the thrust and rivet bucking units 32 comprises a bucking die 40 which is formed with parallel rod-like extensions 41. The die 40 is shiftable by means of a pressure fluid motor 38 between an advanced active position, in which the extensions 41 enter the apertures 35 of the thrust plate 34, and a retracted rest position. The latter position is illustrated in FIGS. 2–4.

On the main frame 20 of the working unit 17 there are located a drive motor and transmission means 42 by which the subunit 24 as well as the entire working unit 17 are propelled along the guiding rules 24 and the rails 18, respectively, when changing working positions. The transmission means comprises a rack and pinion drive 44 for propelling the working unit 17 along the guide beam 16. See FIG. 3. Also carried on the main frame 20 is one part 43 of the control system by which the operation of the assembly system is governed and a small computer terminal 39.

The subunit 24 contains two drilling machines 45, 46 by which the rivet holes in the fuselage sections A, B are produced, a seal compound dispensing gun 47, a rivet store 48, a rivet supply mechanism 49 and a riveting hammer 50. The provision of two drilling machines is due to the need of two different rivet hole diameters in the shown application. Each of the drilling machines 45, 46 is fitted with a combined drill and countersink and a depth locator (not shown in detail) for obtaining a correct countersink depth.

A pressure air supply conduit 51 is connected to the working unit 17 as well as to the thrust and rivet bucking units 32 for supplying pressurized air to the drilling machines 45, 46, the seal compound dispensing gun 47, the rivet supply mechanism 49 and the riveting hammer 50 on the working unit main frame 20 and to the bucking die activating motors 38. Via a mobile power supply unit 52 electric power is supplied to the drive motor means of the working unit 17 as well as to the control system part 43 on the working unit 17.

The control system comprises a portable central unit 53 which contains a programmable computer for governing the stepwise movements of the working unit 17 between the predetermined rivet positions on the sections A, B. The computer program also governs the operation cycles of the machine tools and the rivet handling means 49 on the working unit 17. The central unit 53 is also connected to the thrust and rivet bucking units 32 so as to initiate activation of the bucking die shift motors 38 when appropriate.

When using the assembly system according to the invention for the purpose of assembling aircraft fuselage sections as illustrated in FIG. 1, the guide beam 16 is moved on the arc-shaped girders 11, 12 to a proper position relative to the overlap joint of the sections A, B. Then the guide beam 16 is secured to the sections by means of the screws 31 which at the same time secure the thrust and rivet bucking units 32 on the opposite side of the sections. The sections A, B are pressed together by an evenly distributed clamping force, which guarantees that no burrs arise between the sheet sections during hole drilling.

The working unit 17 is moved between the predetermined riveting positions which are defined as coordinates in the computer program. The riveting positions coincide with the apertures 30 in the guide beam 16 and the apertures 35 in the thrust plates 34 so that the drilling and riveting operations can be performed through said apertures without changing the positions of the guide beam 16 and the thrust plates 34. According to what is determined by the data program, the tools of the working unit 17 are brought into operation in the riveting positions. In each position, the first operation is a single step rivet hole drilling and countersink sequence. This operation sequence is performed by the one of the drilling machines 45, 46 which is fitted with the drill having the correct diameter for the very rivet hole to be drilled. During the drilling and countersink sequence the rivet bucking die 40 is inactive, which means that the rod like extensions 41 are kept outside the apertures 35 not to interfere with the drill penetrating the sheets. After drilling, the working unit 17 is moved to locate the seal compound gun 47 in alignment with the rivet hole. The seal compound gun 47 is advanced into the guide beam aperture 30 and delivers a small amount of seal compound on the countersink portion of the rivet hole. Then the gun 47 is retracted and the working unit 17 is moved another step to bring the rivet supply mechanism 49 into alignment with the rivet hole. A rivet of correct diameter and length is selected and delivered from the rivet store 48 and inserted in the drilled hole. (The seal compound gun 47 and the rivet supply mechanism 49 are not described in detail, because their design is not crucial for the invention).

Having completed the rivet insertion cycle the working unit 17 is moved a further step to align the rivet hammer 50 with the actual riveting position. The rivet hammer 50 is advanced into contact with the head of the inserted rivet. Before the rivet hammer 50 starts impacting the rivet, however, the bucking die 40 covering the actual riveting position is shifted to its active position by energizing the fluid motor 38. Thereby, the rod like extensions 41 of the bucking die 40 enter the thrust plate apertures 35 such that one of the extensions 41 abuts against the shaft of the rivet to be worked. Then the rivet hammer 50 is started to complete the rivet installing operation by working the rivet against the bucking die 40, thereby deforming the rivet shaft up against the sheet metal surface.

Finally, the rivet hammer 50 as well as the bucking die 40 are both retracted to their rest positions, the bucking die 40 not to interfere with drilling or rivet insertion in other holes and the rivet hammer 50 to permit further stepwise movement of the working unit 17.

The operation cycles described above in connection with the installation of one particular rivet may not be carried out in a continuous succession. For example, it might be favourable from the system efficiency point of view to drill two or more holes in a succession of repeated drilling cycles before inserting and upsetting the rivets. The movement pattern for the working unit 17 and the succession of operation cycles is preferably optimized when determining the action program for the system.

Since the control system does not form any part of the invention and since there are several types of commercially available computer based control systems that may be utilized for this purpose, we prefer not to make this specification too extensive by including a detailed description of such a system. The control system used in the above described embodiment of the invention is commercially available under the name: MANIA PCS 100.

In the embodiment shown in FIGS. 5-8 the rigidly attached thrust plates 34 and multi-point bucking dies 41, shown in FIGS. 2-4 are replaced by a movable single point thrust and rivet bucking means 132 which operates synchronously with the working unit 117. In this case the thrust means comprises a tube element 134, and the bucking die comprises a rod-like member 141 longitudinally shiftable within the tube element 134 between a retracted inactive position and an advanced rivet bucking position. According to this embodiment of the rivet assembly device, each riveting position has to be completed, from the drilling of the hole to the upsetting of the rivet, before the drilling of the next rivet hole may be commenced. The reason is that the sections A, B to be assembled have to be pressed together continously during the whole working cycle in order to avoid burrs to be produced or debris to fall down between the sections.

The working unit 117 of this embodiment, which is identical to the working unit 17 of the above described embodiment, is supported on a short guide beam 116 which is mounted on a carriage 160. The latter is slidably guided along the sections A, B on rails 161, and a motor 162 is provided to accomplish a selective movement between different stationary support positions by a rack and pinion drive 163.

Figure 8:
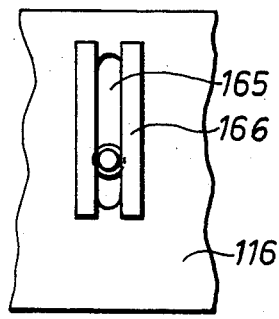
FIG. 8 is a fragmental view of the guide beam shown in FIGS. 5–7.

As in the previously described embodiment of the invention the working unit 117 is displaceably guided on a guide beam 116. In this embodiment, though, the beam 116 is very short and enables the working unit 117 to move just over a distance long enough to have all of its working means, i.e the drilling machines, the seal compound applicator, the rivet inserting means and the rivet hammer aligned with an operation aperture 165 in the guide beam 116. In contrast to the previously described embodiment the guide beam 116 of this embodiment has only one aperture 165 through which the working unit 117 has access to the sections A, B. As shown in FIG. 8, the aperture 165 has a larger extension in the vertical direction than in the horizontal direction. This means that the working unit 117 may reach two or more vertically separated rivet positions in one and the same guide beam position. The beam 116 is supported and longitudinally displaced by the carriage 160 on a constant level above the rails 161.

Figure 7:
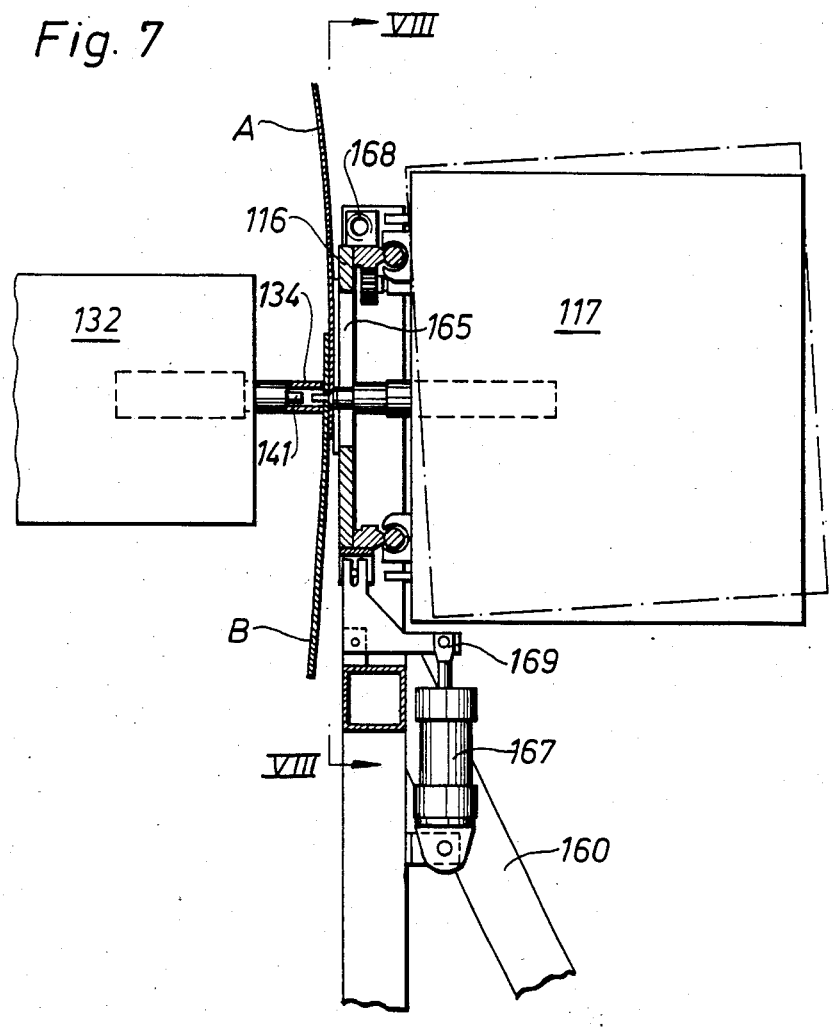
FIG. 7 is an end view on a larger scale and partly in section of the device in FIG. 5.

The beam 116 is mounted on the carriage 160 by means of a pivot 168 so as to be shiftable between a clamping position, shown by continuous lines, and a release position shown by dash dotted lines in FIG. 7. A cylinder 167 and associated linkage 169 are arranged to move the beam 116 and the working unit 117 between these two positions. This is done when the beam 116 together with carriage 160 is to be moved along the rails 161 from one support position to another.

On both sides of the aperture 165 the guide beam 116 is provided with a resilient thrust shoe 166, of for example rubber, the purpose of which is to transfer the thrust or clamping force of the beam 116 onto the sections A, B.

Opposite to the guide beam 116 and the working unit 117 there is a single point thrust and rivet bucking unit 132. The latter is supported on a carriage 170 which is slidably guided along the sections A, B on rails 171, and a motor 172 and a rack and pinion drive 173 are provided to accomplish movement of the carriage 170. The unit 132 comprises means (not shown) for accomplishing vertical displacement of the single point thrust tube 134 and the bucking die 141 between different rivet positions.

In operation, the carriages 160 and 170 are located horizontally by means of motors 162, 172 to positions in which the working unit 117 and the thrust and rivet bucking unit 132 are able to reach the same rivet positions. In such positions of the carriages 160, 170 the working unit 117 and the thrust and rivet bucking unit 132 are located vertically to one and the same position. Before starting drilling of a rivet hole the guide beam 116 is swung into its clamping position by cylinder 167, and the thrust sleeve 134 is extended into contact with the sections A, B so as to perform an opposing thrust force on the latters. Now, as the sections A, B are firmly clamped together, seal compound application, rivet insertion and rivet upsetting is carried out. During the latter operation the rivet bucking die 141 is activated to oppose the action of the riveting hammer of the working unit 117.

Without moving the carriages 160, 170 other rivet positions are reachable through the aperture 165 in the guide beam 116. The working unit 117 is moved transverse to the beam 116 on its subframe, in the same way as described in connection with the above embodiment of the invention, to another rivet position. At the same time the thrust tube 134 and the die 141 are retracted from the sections A, B, and the thrust unit 132 is moved vertically into the new position. Then the thrust tube 134 is reactivated to apply a clamping force on the sections A, B, and a new operation cycle may commence.

I claim:

1. A device for assembling by riveting two or more sections of a sheet element structure, comprising:
   a fixture means for locating said sections in a desired relative position to each other;
   a working unit including hole making and preparing means and rivet installing means including a riveting hammer, said working unit being movable on one side of said sections between predetermined rivet positions;
   a thrust-and-rivet bucking means selectively operable on the opposite side of said sections;
   a programmable control means connected to said working unit and said thrust-and rivet bucking means for governing and coordinating the operation cycles of said working unit and said thrust-and-rivet bucking means;
   a support beam including a guide means for movably supporting said working unit during movement of the latter between said predetermined rivet positions as determined by said control means wherein said support beam has a length that is shorter than the entire length of said sections,
   means for displacing said support beam relative to said sections between two or more stationary positions each of which enables said working unit to reach a plurality of said rivet positions, and
   means for placing said support beam in firm contact with said sections while in said two or more stationary positions.

2. A device for assembling by riveting two or more sections of a sheet element structure, comprising:
   a fixture means for locating said sections in a desired relative position to each other;
   a working unit including hole making and preparing means and rivet installing means including a riveting hammer, said working unit being movable on one side of said sections between predetermined rivet positions;
   a thrust-and-rivet bucking means selectively operable on the opposite side of said sections;
   a programmable control means connected to said working unit and said thrust-and-rivet bucking means for governing and coordinating the operation cycles of said working unit and said thrust-and-rivet bucking means;
   a support beam including a guide means for movably supporting said working unit during movement of the latter between said predetermined rivet positions as determined by said control means; and
   a mounting means for placing said support beam in firm contact with said sections in one or more positions for enabling in each of said one or more positions said working unit to reach at least some of said predetermined rivet positions.

3. Device according to claim 2, wherein said support beam has a length that is shorter than the entire length of said sections, and means for displacing said support beam relative to said sections between two or more stationary positions each of which enables said working unit to reach a certain number of said rivet positions.

4. Device according to claim 2, wherein said thrust-and-rivet bucking means is arranged to exert a continuous clamping force onto said sections adjacent the rivet position being worked during the complete operation cycles of said hole making and preparing means and said rivet installing means, whereas said support beam forms a back-up means on the opposite side of said sections to provide a reaction force equal to said clamping force.

5. Device according to claim 2, wherein said working unit is arranged to occupy successively two or more working positions for each of said rivet positions in order to provide access to each of said rivet positions for its hole making and preparing means and its rivet installing means.

6. Device according to claim 2, wherein said mounting means rigidly attaches said support beam onto said sections.

7. Device according to claim 6, wherein said support beam has a length which is substantially equal to the entire length of said sections.

8. Device according to claim 7, wherein said mounting means comprises a number of threaded fasteners which extend through said sections.

9. Device according to claim 7, wherein said thrust-and-rivet bucking means is connected to said sections by said mounting means.

* * * * *